April 1, 1969 J. VACKÁŘ 3,436,686
AMPLITUDE MODULATION CIRCUIT WITH HIGH POWER EFFICIENCY FOR TWO AMPLIFIERS
Filed June 28, 1965
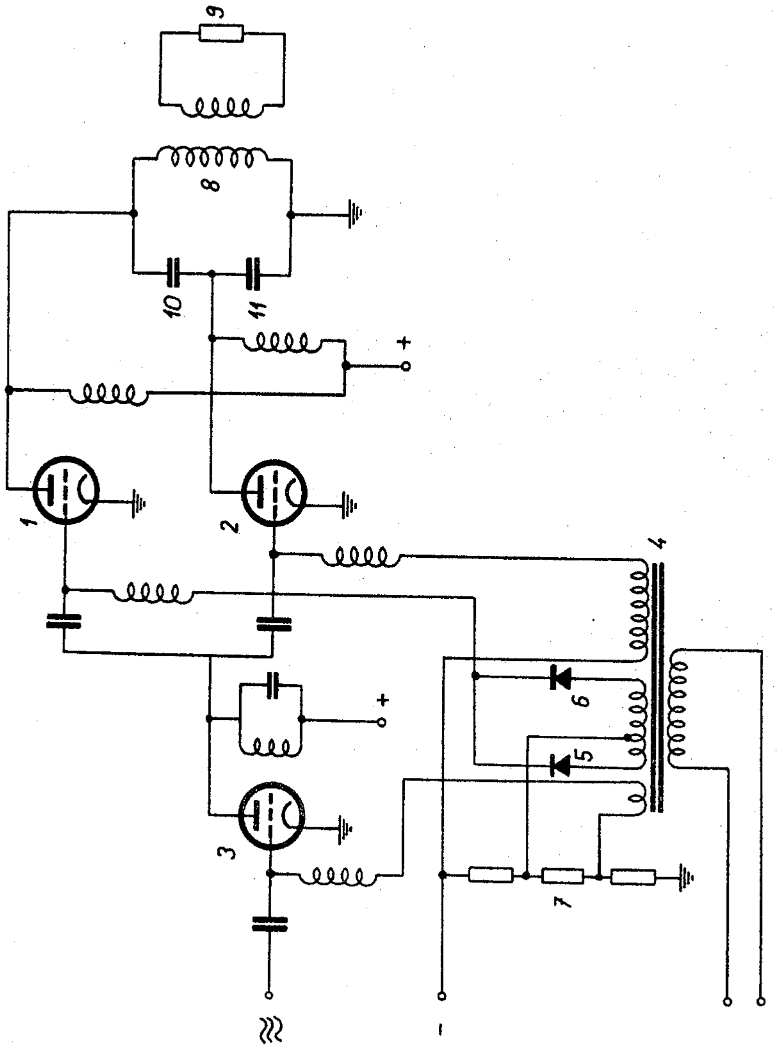
INVENTOR.
Jiří Vackář
BY
Ag't United States Patent Office 3,436,686
Patented Apr. 1, 1969

3,436,686
AMPLITUDE MODULATION CIRCUIT WITH HIGH POWER EFFICIENCY FOR TWO AMPLIFIERS

Jiří Vackář, Prague, Czechoslovakia, assignor to Tesla, narodni podnik, Prague, Czechoslovakia Filed June 28, 1965, Ser. No. 467,302
Claims priority, application Czechoslovakia, July 15, 1964, 4,096/64
Int. Cl. H03c 1/02
U.S. Cl. 332—64 6 Claims

ABSTRACT OF THE DISCLOSURE

A pair of grid-modulated high frequency amplifiers are driven by a common driving stage connected to their control grids. The output electrodes of the amplifiers are connected to a common load circuit having a pair of input terminals, a common load resistance and an impedance transforming network having two different transformation ratios connected to the input terminals and coupled to the load resistance. The amplifiers are modulated by a modulating power source having a pair of output leads each connected to a corresponding one of the control grids of the amplifiers and a rectifier connected in one of the output leads. The one of the output leads applies to the control grid of one of the amplifiers a rectified pulsating modulating voltage of negative polarity and the other of the output leads applies to the control grid of the other of the amplifiers a normal modulating voltage, The invention relates to a circuit arrangement for amplitude modulation of high-frequency high-power equipment, particularly in broadcasting transmitters.

Amplitude modulation in which quality indicators and power efficiency is important, is carried out in several known ways, such as, for example, by anode modulation in class B outphasing and similar derived systems of modulation, Doherty modulation, etc. Some other suggested circuit arrangements are, for example, the Twatt-circuit comprising two grid-modulated amplifiers energized by a common driving source and matched to a common load by different transformation ratios. The Twatt-circuit provides practically the same efficiency as the aforesaid circuits in a simpler and more advantageous way. The circuit is, however, impractical, due to considerable shortcomings in the abnormal working conditions of the amplifying tubes.

The object of this invention is to provide a circuit arrangement for amplitude modulation of a transmitter having two grid-modulated high frequency amplifiers energized by a common source in the same phase and supplying a high frequency output to a common load. One of the amplifiers, designated as a carrier amplifier, supplies the output in the bottom modulating half-waves and in non-modulating condition, such amplifier being connected to the full impedance of the output circuit. The other of the amplifiers supplies the output in the upper modulating half-waves and is connected to the tap of the output circuit. The grid of the carrier amplifier tube is connected to a source of two-way rectified low-frequency modulating voltage of negative polarity.

The original shortcomings of the Twatt-circuit are overcome by the circuit arrangement according to the invention, by means of which the dissipated power on the grids of the tubes is decreased. The danger of parasitic oscillations of the Barkhausen-Kurz type is also removed and considerable savings of driving power and an increase of overall efficiency is gained.

In order that the present invention may be readily carried into effect, it will now be described with reference to the accompanying drawing, wherein the single figure is a circuit diagram of an embodiment of the amplitude modulating circuit of the present invention. The modulated terminal high frequency amplifier in the figure comprises two amplifier tubes 1 and 2 working in parallel. The tubes 1 and 2 are energized in phase by a high frequency amplifier 3 connected in their input circuits and are grid-modulated by low-frequency voltage from the transformer 4. The tube 1 is biased by a DC voltage divider 7 and is driven by the high frequency amplifier stage 3 in non-modulated condition. The tube 1 is fully energized in the non-modulated condition and supplies a full output of the transmitter carrier wave to the output circuit 8. The output circuit 8 is coupled to and loaded with the load 9. The circuit operates at full efficiency.

A considerably higher DC bias is applied to the amplifier tube 2 by the voltage divider 7 in a non-modulated condition, so that said tube is fully non-conductive. It is conductive only in the positive or upper modulating half-waves.

At full modulation ($m=100\%$), low frequency voltage is applied from the modulating transformer 4 to the grid of the tube 2. The tube 2 then produces four times the current produced by the tube 1. The low frequency voltage is added to the bias from the voltage divider 7 and switches the tube 2 to its conductive condition in the positive modulating half waves for high frequency energization by the preceding amplifier stage 3. The tube 2 is fully energized at the upper modulating peak and supplies to the output circuit 8 four times the output of the carrier wave. The tube 2 operates into an impedance four times lower than does the tube 1, due to the capacitive divider 10, 11. The anode high frequency voltage and the efficiency of the tube 2 are at that instant also a maximum and the same as for the tube 1 in non-modulated condition.

Nevertheless, due to the resonance transformation of the circuit 8, the anode of the tube 1 is located at such instant of the upper modulation peak with a double high frequency amplitude, the peak value of which approaches twice the value of the direct anode voltage. The tube 1 cannot supply any output in this condition and consequently there is no purpose in driving it. Further negative modulating voltage from the transformer 4 is therefore applied to the grid of the tube 1 via rectifiers 5 and 6 in addition to the bias from the voltage divider 7, by which said tube is switched to its non-conductive condition. In this way, superfluous dissipation on the grid of the tube 1 is avoided, the required driving power is decreased, and the danger of parasitic oscillations, occurring at a positive grid voltage and simultaneously at a negative anode voltage (Barkhausen-Kurz), is removed.

This situation is far simpler in the negative modulating half-waves. The tube 2 is switched to its non-conductive condition by the bias and by the negative modulating voltage from the transformer 4, the tube 1 supplies the total high frequency output, and the tube 1 is continuously maintained in conductive condition by the modulating voltage from the transformer 4 via the rectifiers 5 and 6.

Since the requirement for energizing power varies during the course of the modulating cycle, it seems advantageous to modulate partially even the preceding amplifier stage 3. The tertiary winding of the transformer 4 is used for this purpose, the voltage of said winding being added to the DC bias of the tube 3 supplied by the voltage divider 7.

What I claim is:

1. A circuit arrangement for amplitude modulation of a transmitter, said circuit arrangement comprising a pair of grid modulated high frequency amplifiers, each of said amplifiers having a control grid and an output electrode;

common driving means connected to the control grids of said amplifiers;

a common load circuit having a pair of input terminals, a common load resistance and an impedance transforming network having two different transformation ratios connected to said input terminals and coupled to said load resistance;

means connecting the output electrode of one of said amplifiers to one of the input terminals of said load circuit and means connecting the output electrode of the other of said amplifiers to the other of said input terminals; and modulating power means for modulating said amplifiers, said modulating power means comprising a pair of output leads each connected to a corresponding one of the control grids of said amplifiers and rectifier means connected in one of said output leads, said one of said output leads applying to the control grid of one of said amplifiers a rectified pulsating modulating voltage of negative polarity and the other of said output leads applying to the control grid of the other of said amplifiers a normal modulating voltage.

2. A circuit arrangement as claimed in claim 1, wherein said rectifier means comprises a full-wave rectifier.

3. A circuit arrangement as claimed in claim 1, wherein the impedance transforming network of said common load circuit comprises a closed loop having a pair of capacitors and an inductor in series connection, said one of the input terminals of said load being at a common point in the connection between said inductor and one of said capacitors and said other of said input terminals being at a common point in the connection between said capacitors.

4. A circuit arrangement as claimed in claim 1, further comprising voltage divider means coupled to said modulating power means for providing DC bias voltages for said amplifier.

5. A circuit arrangement as claimed in claim 1, further comprising means coupling said modulating power means to said common driving means for energizing said common driving means.

6. A circuit arrangement as claimed in claim 1, further comprising voltage divider means coupled to said modulating power means for providing DC bias voltages for said amplifier and means coupling said modulating power means to said common driving means for energizing said common driving means, and wherein said rectifier means comprises a full-wave rectifier and the impedance transforming network of said common load circuit comprises a closed loop having a pair of capacitors and an inductor in series connection, said one of the input terminals of said load being at a common point in the connection between said inductor and one of said capacitors and said other of said input terminals being at a common point in the connection between said capacitors.

References Cited

UNITED STATES PATENTS 2,539,243 1/1951 Franklin ---------- 332—48 X

ALFRED L. BRODY, *Primary Examiner.*

U.S. Cl. X.R.

332—48, 59; 330—129, 144